Patented Jan. 8, 1929.

1,698,302

UNITED STATES PATENT OFFICE.

BYRON CASSIUS GOSS, OF CLEVELAND, OHIO, ASSIGNOR TO GENERAL ELECTRIC COMPANY, A CORPORATION OF NEW YORK.

COATING METHOD.

No Drawing.   Application filed April 22, 1921.   Serial No. 463,567.

My invention relates to coating materials and more particularly to coating materials for application in a substantially cold or unheated condition to various surfaces.

The coating material of my invention may be applied to glass or other vitreous surfaces, to metals, to wood, and to surfaces such as the interior walls of buildings. By mixing proper coloring ingredients with the coating material, it is possible to secure the desired color effect when the coating material is applied to a surface. My invention is comparatively permanent as it successfully resists high temperatures, hot or cold water, weak acid solutions and ordinary abrasive efforts. The surface coated according to my invention is smooth and velvety and lighting glassware so coated does not materially reduce the amount of light passing therethrough when compared with other coated surfaces.

While not limited in use thereto, my invention is especially applicable to incandescent lamps and illuminating equipment such as reflectors and shades. By the use of my invention in connection with glass surfaces, it is possible to dispense with sand-blasting and acid etching which are unsanitary. By means of my invention a frosted, a tinted or a similar surface may be produced upon a glass surface quickly and in a sanitary operation.

According to my invention, a body material is peptized, that is, changed from a solid state into a permanent colloidal suspension, by the addition of hydroxyl ions. The adsorption of hydroxyl ions gives a negative charge to the body material particles, causing them to repel each other and, therefore, to form a permanent colloidal solution or suspension. Then I add a suitable binding material to form a film around the body material particles. Suitable coloring and opacifying ingredients may be added as desired. After applying the mixture in any convenient manner to the surface to be coated, I prefer to protect this coating to prevent a reaction between its ingredients and injurious vapors present in the air.

More specifically, I peptize kaolin, or other suitable body material capable of being peptised by means of sodium hydroxide or other suitable material containing hydroxyl ions. I prefer that the body material be sufficiently white in color and that it contain a sufficient percentage of plastic material. After a colloidal solution is obtained, I add sodium silicate as a binder although other binding materials such as potassium silicate may be used. Opacifying and coloring ingredients are also added if desired. I am aware of the fact that it is common practice to prepare a coating by grinding kaolin with sodium silicate but such a method does not yield a permanent, uniform and finely divided suspension which can be used to produce a smooth and velvety frosted effect. After the mixture of my invention is applied to a surface, I prefer to protect this coating to prevent a chemical reaction between the sodium silicate and carbon dioxide in the air and to render it impervious to the action of water. While I may use any material which will so protect the coating, I prefer to use a "fixing solution" which consists of a solution of any compound which will form a white insoluble compound or adsorption compound with sodium silicate or other binding material which may be used. For the fixing solution, I prefer to use metallic salts as I have found a harder compound is formed than when an acid is used. Moreover, the disadvantages attendant upon the use of acid are obviated. I prefer to use a solution of zinc chloride and aluminum sulphate for the fixing solution although the alums or the soluble salts of zinc, tin, magnesium, calcium, or any other similar material may be used separately or in combination.

In a specific example of a coating embodying my invention the following materials and proportions are used:

Mixture A.

| | |
|---|---|
| Kaolin | .548 pounds |
| Magnesium oxide | .108 pounds |
| Alumina | .638 pounds |
| Zirconium oxide | .108 pounds |
| Sodium hydrate | .0035 pounds |
| Sodium silicate | 4.380 pounds |
| Amyl aclohol | .0016 gallons |
| Water | .546 gallons |

The mixture, which is used to produce a frosted coating upon glass surfaces, is preferably prepared according to the following procedure: The amyl alcohol is mixed with the sodium hydrate and distilled water to form a solution and the resulting solution is added to the kaolin. I prefer to use Georgia kaolin although other suitable materials, which are capable of being peptized, may be used. The kaolin and sodium hydrate solution containing the amyl alcohol are mixed in a ball mill for about eight hours, together with the coloring and opacifying ingredients, magnesium oxide, alumina and zirconium oxide. The purpose of the amyl alcohol is to lower the surface tension of the sodium hydrate solution so that it will more readily mix with the kaolin to form a colloidal solution and also to cause the final solution to flow freely at the spray nozzle if applied to a surface by spraying. While I prefer to use amyl alcohol, it is not essential in preparing a coating embodying my invention. After the sodium hydrate, kaolin and the coloring and opacifying materials have been thoroughly mixed to form a colloidal solution, sodium silicate, which serves as a binder, is added and this solution mixed in a ball mill for fifteen hours. The resulting solution is tightly sealed in suitable containers until used in order to avoid any drying action. Care is taken to see that the ball mill is thoroughly cleaned after the completion of each batch of coating mixture since the presence of sodium silicate in contact with the kaolin before it is in colloidal solution prevents complete peptization.

As previously stated, mixture A is used to produce a frosting coating upon glass surfaces. I have found that the use of magnesium oxide in the mixture gives the coated surface a satin finish when cold and increases the weathering properties of the coating. Further, when light passes through the coated surface, the diffusion of the light is increased for the same absorption over that given by the mixture without the magnesium oxide. Zirconium oxide is used because of its high refractive index, luster and extreme resistance to chemical action.

The fixing solution is composed of approximately 20 per cent zinc chloride and 10 per cent aluminum sulphate, hydrated. The action of the zinc chloride and aluminum sulphate is to convert the sodium silicate with which it contacts probably into aluminum silicate or at least into an adsorption compound of aluminum and silica which is impervious to weak acids and hot or cold water and which is harder than the silicate acid which is formed when the sodium silicate is subjected to the action of acids.

The coating mixture is preferably sprayed upon the surface to be coated and after drying for about ten minutes at approximately 85° C. the fixing solution is sprayed over the coating solution, or applied by dipping. If the fixing solution is used cold a period of approximately three minutes is desirable for effecting a proper reaction but if the solution is used at a temperature between 50° C. and 70° C. a period of about fifty seconds to one minute is sufficient. For heavier coatings the periods of time for drying and fixing are somewhat longer.

The coating solution of mixture A, previously given, produces a frosted effect upon a glass surface similar to that secured by sand-blasting or acid etching and is grayish white. Various coloring pigments or suitable dyes may be added to this basic coating solution to produce any tint desired. For example, an incandescent lamp may be made to give light of a color similar to that of light emitted by a candle flame by adding approximately one per cent by weight of burnt sienna to the basic coating solution. The fixing solution is the same as that used with the basic coating solution.

For increasing the opacity of the coating, I may add to the basic coating solution zinc oxide and similar opacifying agents, the amount used depending upon the amount of opacity desired. However, I prefer to use the following mixture for producing a comparatively dense opal coating upon glass:

*Mixture B.*

| | |
|---|---|
| Kaolin | 1.780 pounds |
| Zinc oxide | .445 pounds |
| Tin oxide | .445 pounds |
| Sodium hydrate | .014 pounds |
| Sodium silicate | 5.780 pounds |
| Water | .394 gallons |

The fixing solution is the same as before.

For securing a lighter density of opal coating than is secured with mixture B and yet more dense than mixture A, I may use any one of the three following mixtures which also show variations and modifications of the coating solution of my invention:

*Mixture C.*

| | |
|---|---|
| Kaolin | 2.472 pounds |
| Alumina | .816 pounds |
| Sodium hydrate | .016 pounds |
| Sodium silicate | 3.857 pounds |
| Water | .471 gallons |

*Mixture D.*

| | |
|---|---|
| Kaolin | 2.540 pounds |
| Zirconium oxide | .310 pounds |
| Sodium hydrate | .015 pounds |
| Sodium silicate | 3.160 pounds |
| Water | .480 gallons |

*Mixture E.*

| | |
|---|---|
| Kaolin | 2.556 pounds |
| Zinc oxide | .319 pounds |
| Sodium silicate | 3.857 pounds |
| Water | .487 gallons |

In each case, the fixing solution is the same as before.

When it is desired to coat a surface such as metal or wood, I prefer to use a mixture such as the following:

*Mixture F.*

| | |
|---|---|
| Kaolin | 1.600 pounds |
| Zinc oxide | .800 pounds |
| Tin oxide | .800 pounds |
| Sodium hydrate | .010 pounds |
| Sodium silicate | 5.198 pounds |
| Water | .400 gallons |

The same fixing solution is also used with this mixture. This mixture differs from mixture B in that it has greater viscosity, opacity and covering power. It has the advantage over fired enamels in that it will not chip or crack off yet it has the desired reflecting qualities and may readily be washed without damage. Moreover, since high temperatures are not necessary with this mixture, the shape of metal articles is not warped as is often the case with fired enamels. While not limited in use thereto, this mixture is especially adapted for coating metal reflectors.

While I have preferably used Georgia kaolin as a body material in the coating solution, I may use kaolinite or other clays which are sufficiently white or uncolored by impurities and which contain a sufficient percentage of plastic material or I may use any body material capable of being peptized. The sodium hydrate solution used in the basic coating solution may be replaced by hydroxides of other alkali metals, such as potassium hydrate solution, or by other solutions containing hydroxyl ions. While I prefer to use amyl alcohol to lower the surface tension of the solution when the coating is applied by spraying, a coating solution embodying my invention can be prepared without amyl alcohol. Sodium silicate may be replaced by any similar inorganic binding material such, for example, as potassium silicate. For the fixing solution may be used any material, or mixture of materials, which will react with the binding material of the coating solution to form an insoluble, comparatively inert material and with a sodium silicate binder such materials are soluble aluminum, zinc, tin, magnesium and calcium salts, alums and similar substances.

A coating of a coating solution embodying my invention when applied to various surfaces is harder than the ordinary superficial coating in that it is more resistant to mechanical scratching and abrasion. It is resistant to the action of water and ordinary weak acid solutions and is not subject to an action which may be called "blooming". The usual coating material employing sodium silicate as a binder is subject to "blooming" which is probably due to the hydration and dehydration of sodium carbonate formed by the partial conversion of sodium silicate to sodium carbonate due to the adsorption of carbon dioxide from the air. The coating is smooth and velvety both in appearance and feel. This is due to the uniform and finely-divided suspension produced according to my invention. Moreover, the coating is practically permanent.

It should be obvious that instead of applying the coating solution of my invention over an entire surface, the coating solution may be applied to the surface as a design of any shape or pattern by the use of stencils or other suitable means. While my coating and fixing solutions may be applied to various surfaces, they are especially adaptable to lighting equipment.

What I claim as new and desire to secure by Letters Patent of the United States, is:—

1. The method of forming a coating on a glass surface which consists in applying thereto a liquid comprising an insoluble body material, an alkaline silicate and an alkaline hydrate, the proportions being such that there is present materially more of the alkaline hydrate than is contained in commercial grades of the alkaline silicate, drying the coating and afterwards treating the coating with a fixing solution which reacts therewith to form an insoluble compound.

2. The method of forming a coating on a glass surface which consists in applying thereto a liquid comprising an insoluble body material, an alkaline silicate and an alkaline hydrate, the proportions being such that there is present materially more of the alkaline hydrate than is contained in commercial grades of the alkaline silicate, drying the coating and afterwards applying thereto a re-agent which will precipitate silica.

3. The method of forming a coating on a glass surface which consists in applying thereto a liquid containing an insoluble body material, an alkaline silicate, an alkaline hydrate and a re-agent for reducing the surface tension of the solution, drying the coating and afterwards applying a fixing solution.

4. The method of forming a coating on a glass surface which consists in applying thereto a liquid containing an insoluble body material, an alkaline silicate, an alkaline hydrate and amyl alcohol for reducing the surface tension of the solution, drying the coating and afterwards applying a fixing solution.

In witness whereof I have hereunto set my hand this twentieth day of April, 1921.

BYRON CASSIUS GOSS.